Nov. 27, 1928.  1,693,344
E. C. MORGAN
LOADING AND CONVEYING APPARATUS FOR COAL MINES
Filed Aug. 11, 1921  6 Sheets-Sheet 2
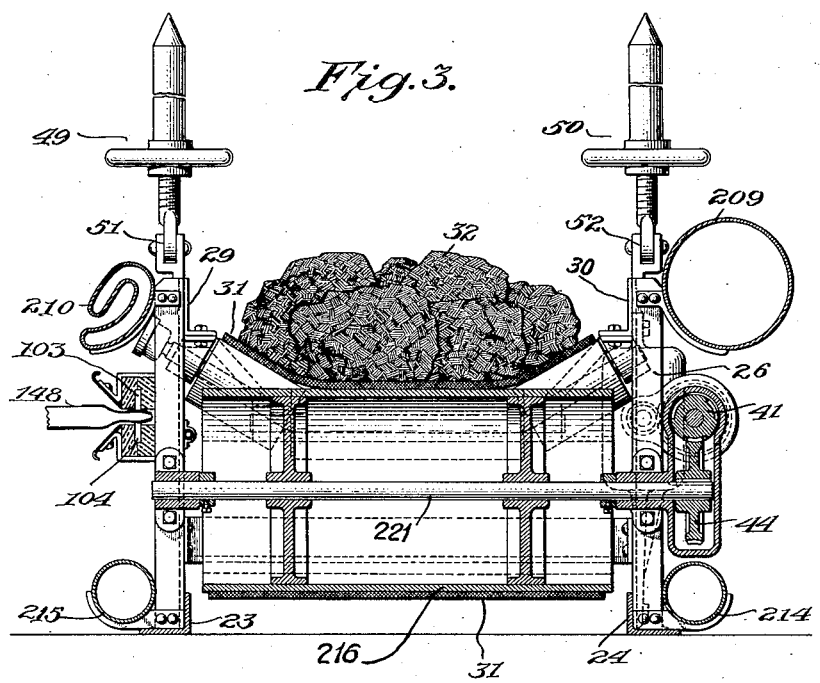
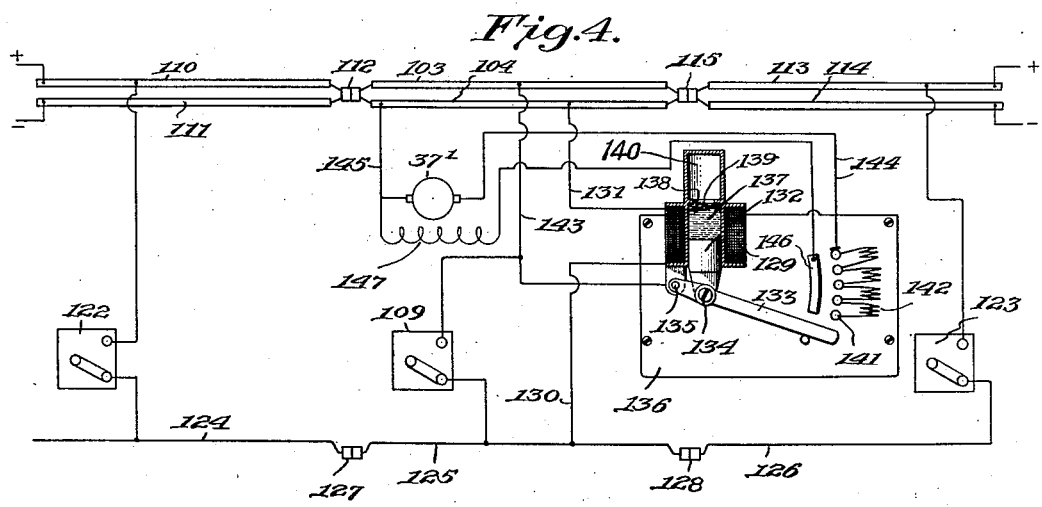

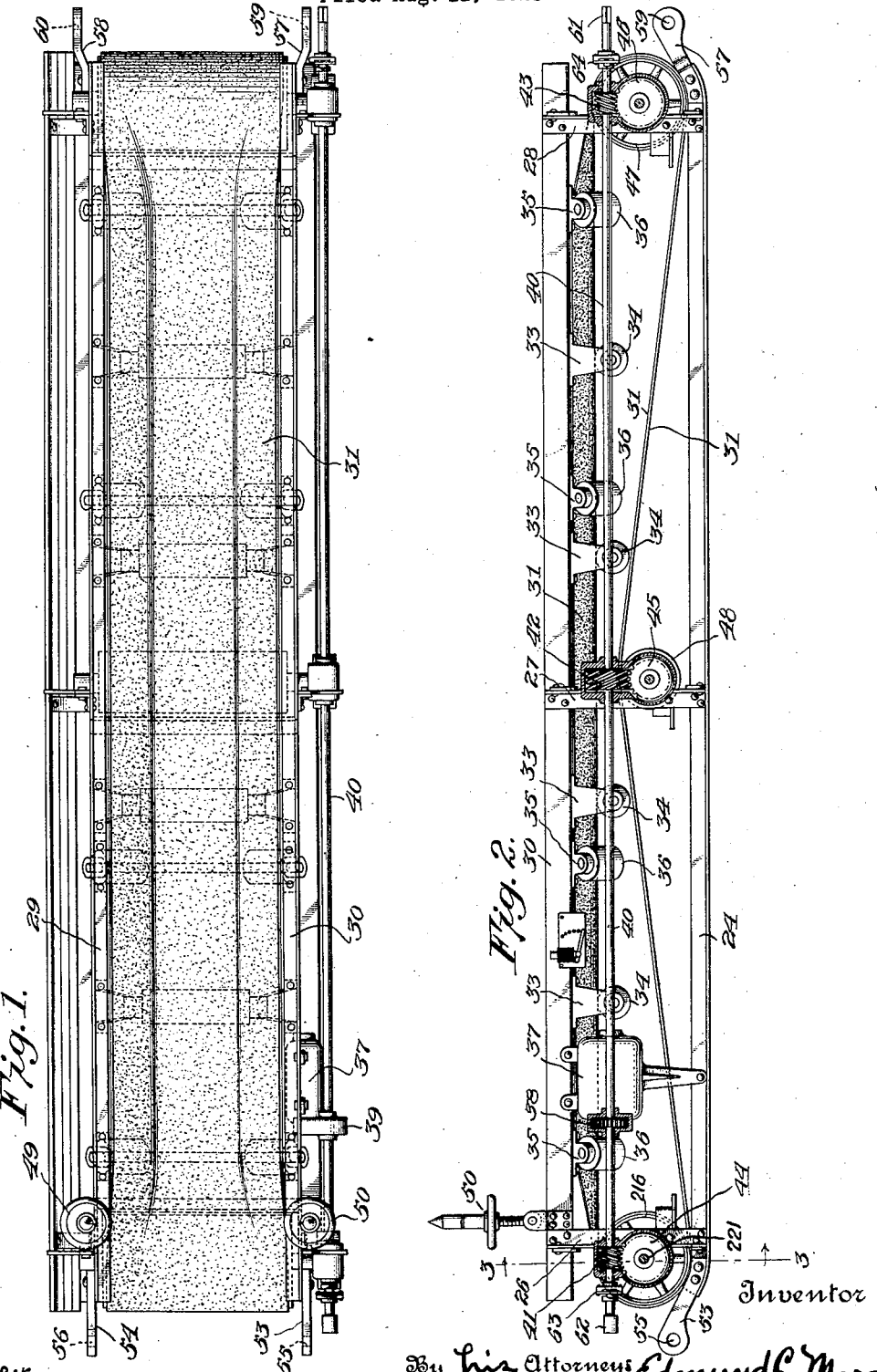

Nov. 27, 1928.
E. C. MORGAN
1,693,344
LOADING AND CONVEYING APPARATUS FOR COAL MINES
Filed Aug. 11, 1921
6 Sheets-Sheet 3
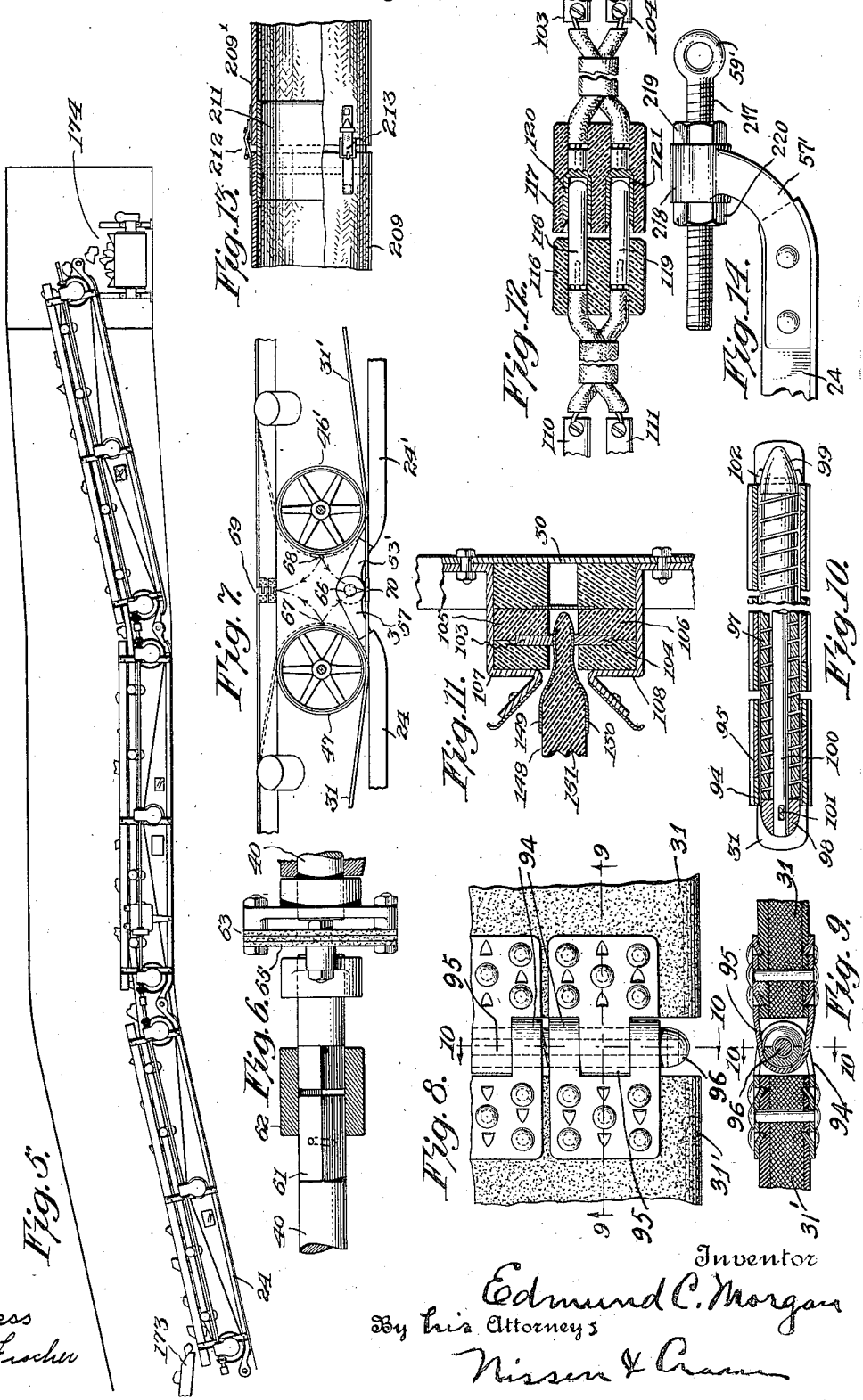

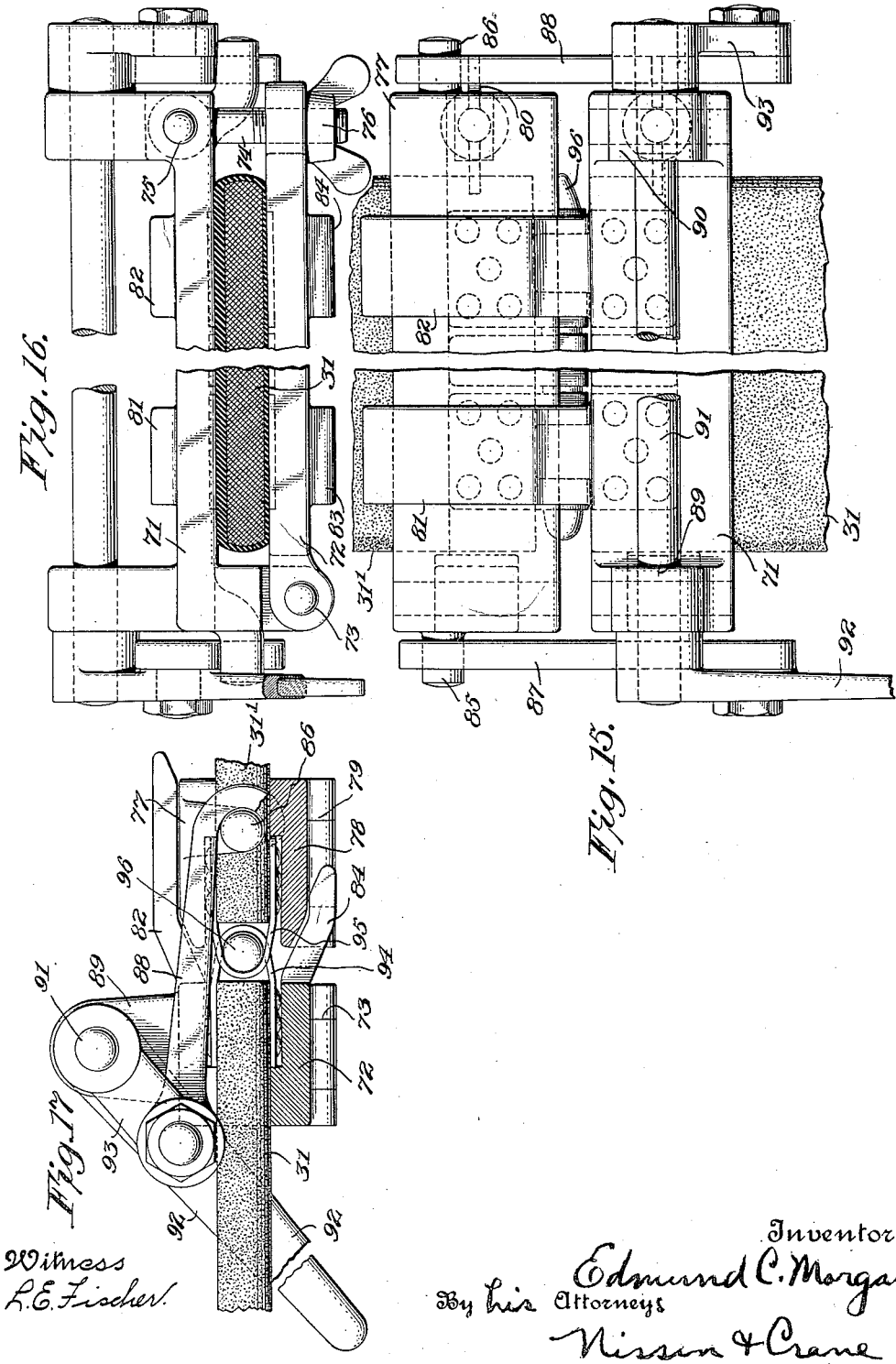

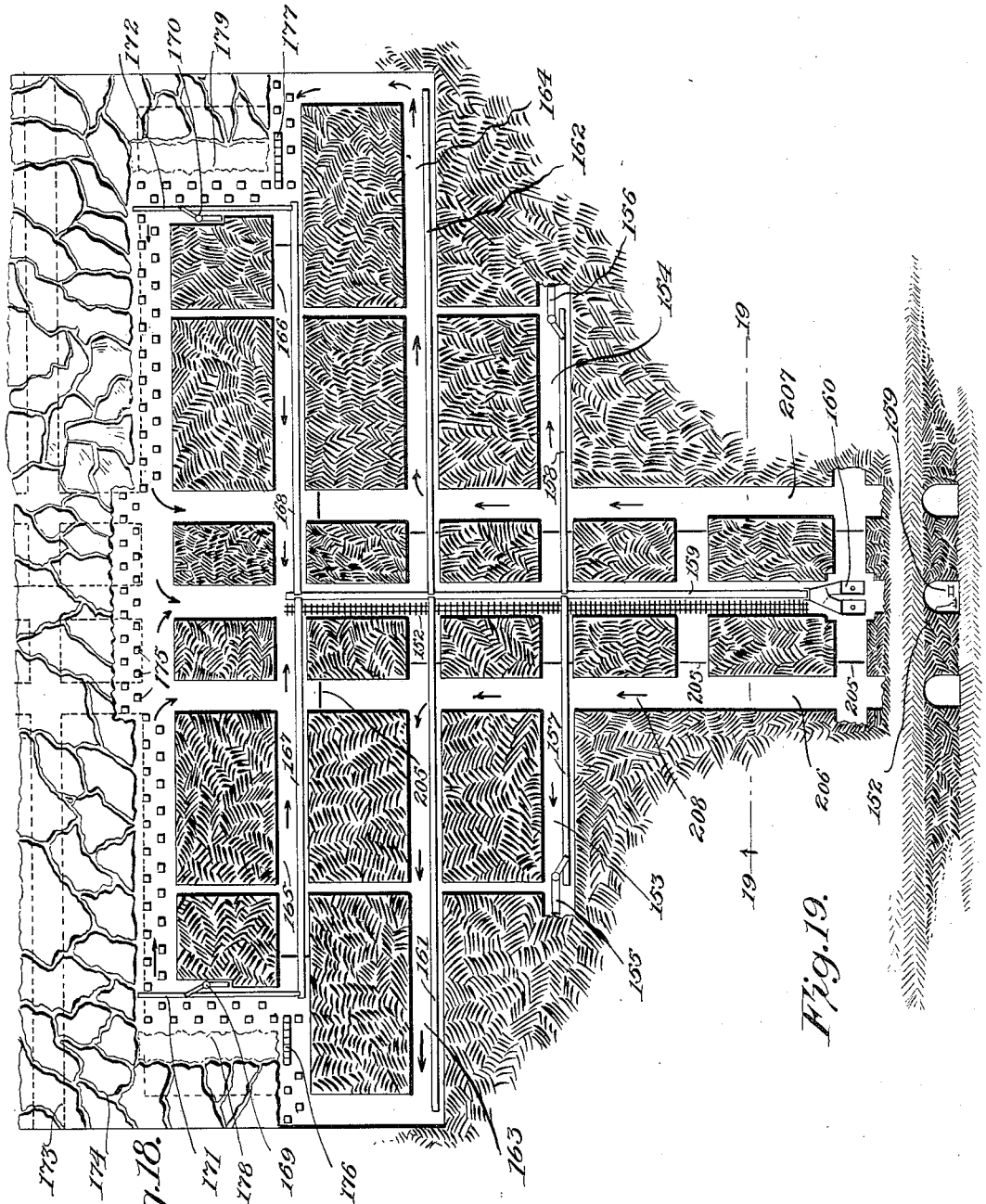

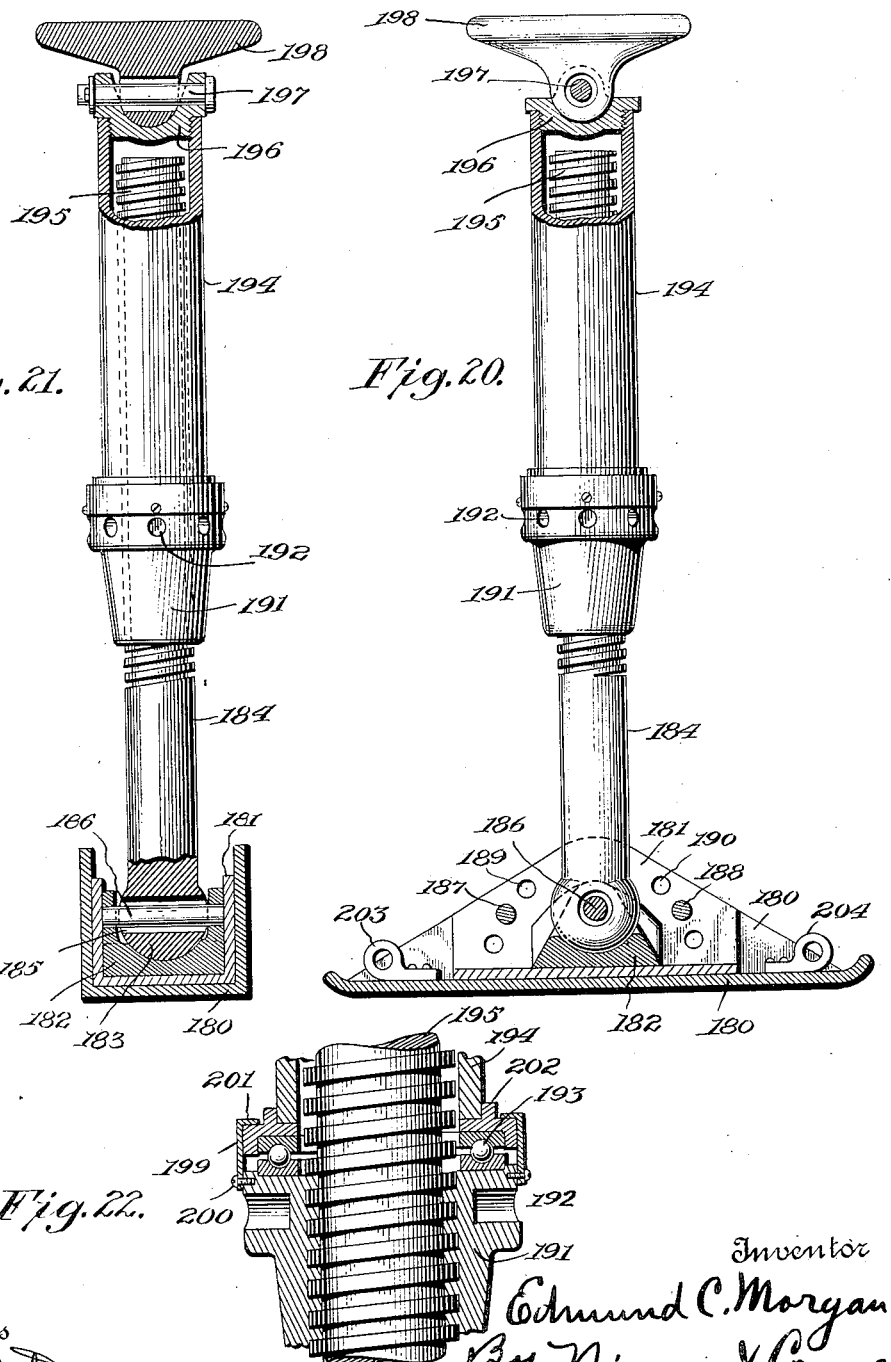

Patented Nov. 27, 1928.

1,693,344

UNITED STATES PATENT OFFICE.

EDMUND C. MORGAN, OF NEW YORK, N. Y.; OLIVE EUGENIE MORGAN EXECUTRIX OF SAID EDMUND C. MORGAN, DECEASED.

LOADING AND CONVEYING APPARATUS FOR COAL MINES.

Application filed August 11, 1921. Serial No. 491,474.

My invention relates to conveying apparatus adapted for loading coal in coal mines, although it may have a general application, and one of the objects of the invention is the provision of a sectional extensible conveyer comprising individual units which may be placed end to end to form one continuous conveyer of any desired length according to the number of units used. More particularly, it is the object of the present invention to provide conveyer units comprising endless traveling conveyer elements, and means for connecting the units together so that such endless traveling conveyer elements will be united to form continuous traveling conveyer elements for the extended conveyer.

A further object of the invention is the provision of conveyer units, each comprising an endless traveling conveyer belt adapted to be connected to a similar endless traveling conveyer belt of another unit to form a continuous extended traveling conveyer belt of conveyer units connected end to end.

A further object of the invention is the provision of a sectional extensible conveyer comprising a plurality of units, each complete in itself and adapted to be operated separately, but also capable of being connected to other units to form such extensible conveyer with the conveyer of each unit connected to the conveyers of the next adjacent unit to form one continuous conveyer.

A further object of the invention is the provision of an endless traveling conveyer particularly adapted for low-roof mines with the driving power distributed for application to a plurality of portions of the conveyer to minimize the tension on the end portions of the conveyer and thus permit the use of pulleys of smaller diameter where the belt is changed in its traveling direction.

Another object of the invention is the provision of sectional conveyer units for an extensible conveyer, each unit being provided with power transmission mechanism for distributing the application of the driving power to the conveyer elements.

A further object of the invention is the provision of sectional conveyer units each provided with power transmission mechanism adapted to be connected to a motor on one of the units and each unit being provided with means for controlling the operation of the extended conveyer after the units are connected together.

Another object of the invention is the provision of improved means for connecting the ends of the belts of conveyer units together while permitting the belt to be bent by deflection rollers to form a conveyer trough.

A further object of the invention is the provision of improved means for clamping the ends of the belts of conveyer units and drawing them together for connection end to end.

Another object of the invention is the provision of a plurality of sectional conveyer units flexibly connected together for adaptation to irregularities in elevation of the mine floor and for adaptation to receive dislodged coal at various elevations and to deliver it at an adjusted elevation.

A further object of the invention is the provision of sectional conveyer units adapted to be connected end to end to form one continuous conveyer of any desired length so that the dislodged coal may be received, conveyed and delivered with the formation of the minimum amount of slack.

Another object of the invention is the provision of sectional extensible conveyer apparatus, each unit of which is provided with one or more pipes or ducts adapted to be connected to similar pipes or ducts of adjacent units to establish a continuous pipe or duct from one end of the conveyer apparatus to the other for the passage of a fluid.

A further object of the invention is the provision of a sectional extensible conveyer each unit of which is provided with spaced-apart insulated connectors leading from the source of electrical power supply and adapted to be coupled to similar connectors on the next adjacent unit to form the source of electrical supply from any portion of the conveyer throughout its length, such as a trolley for a mine locomotive traveling on a mine track parallel to the extended conveyer.

Another object of the invention is a system of mining in which rooms and pillars are first formed in the mine chamber and then the pillars removed by the retreating system while the subsidence of the roof is controlled and conveyer apparatus employed for loading the dislodged coal, such conveyer apparatus being composed of detachable units which may be disconnected as the retreating operations are carried on.

Another object of the invention is the provision of improved roof-supporting mechanism for controlling the subsidence of the roof in a mine chamber after a coal vein has been mined.

Furthermore, my invention comprises a method of mining in which entries are driven in various directions and sectional conveyers extended to any desired length by coupling together the traveling conveyer elements to form continuous conveyers for receiving the material where dislodged and conveying the same to a main conveyer also composed of a plurality of units connected end to end with the traveling conveyer elements thereof forming a single traveling conveyer.

Another object of my invention is an improved method of mining comprising the driving of a main entry and extending a sectional conveyer along the floor thereof in position to receive material from similar sectional conveyers laid along the floor of butt entries, which extend laterally from the main entry, connecting or detaching the conveyer sections in accordance with the direction of mining operations, and maintaining the conveyers in relatively low positions by connecting the units to form separate continuous conveyers along each entrance.

Other objects of the invention will appear hereinafter, the novel features and combinations being set forth in the appended claims.

Referring to the accompanying drawings:

Figure 1 represents a plan view of my improved conveyer unit which is adapted to be connected to similar units at both ends to form an extensible conveyer.

Fig. 2 is an elevational view of Fig. 1 with some parts in section.

Fig. 3 is a sectional end elevation on the line 3—3 of Fig. 2 looking in the direction of the arrows and showing the belt when a plurality of conveyer units are connected together.

Fig. 4 is a diagrammatic illustration of the circuits and connections for the electric motor of the conveyer and the motor control mechanism.

Fig. 5 is an elevational view showing three conveyer units connected together to form one continuous conveyer.

Fig. 6 illustrates a coupling between the drive-shafts of the conveyer unit.

Fig. 7 is a view more or less diagrammatic to show the manner in which the conveyer belt of one unit may be connected to the conveyer belt of the next adjacent unit.

Fig. 8 is a plan view of a fragmentary portion of the flexible connection between the conveyer belt of one unit and the conveyer belt of the next adjacent unit.

Fig. 9 is a sectional elevation of Fig. 8 on the line 9—9, looking in the direction of the arrows.

Fig. 10 is a sectional elevation of Figs. 8 and 9 on the line 10—10, looking in the direction of the arrows.

Fig. 11 illustrates electrically insulated connectors, with a trolley contacting therewith.

Fig. 12 is an electric coupling adapted to electrically connect the bus bars on each unit to the next adjacent unit.

Fig. 13 illustrates the means for strapping together the conducting pipe of one conveyer unit and the conducting pipe of the next adjacent unit, particularly the upper side pipes which are adapted for use in a ventilating system, comprising a sectional pipe extending along the sides of the conveyer units.

Fig. 14 illustrates a modification of the flexible connections between the ends of the conveyer units.

Fig. 15 is a plan view of belt clamping mechanism for bringing together the adjacent ends of the belts of conveyer units.

Fig. 16 is an elevational view of the structure shown in Fig. 15.

Fig. 17 is a side view of the structure shown in Figs. 15 and 16 showing the manner in which the ends of the belts of adjacent conveyer units are brought together so that the flexible connecting pin of Fig. 10 may be placed in the position illustrated in Fig. 8.

Fig. 18 illustrates my improved system and my improved method of mining by the use of the extensible conveyer mechanism shown in Figs. 1, 2, 3 and 5.

Fig. 19 is a sectional elevation of Fig. 18 on the line 19—19 looking in the direction of the arrow.

Fig. 20 is an elevational view of roof supporting mechanism for controlling the subsidence of the roof in the system and method illustrated in Fig. 18.

Fig. 21 is a sectional side elevation of the roof jack shown in Fig. 20; and

Fig. 22 is a sectional detail view of a part of the structure shown in Figs. 20 and 21.

Referring to Figs. 1, 2, 3 and 5, 23 and 24 designate longitudinal angle bars adapted to support the framework of the conveyer unit so that the latter may slide over the mine floor. As shown in Fig. 2 spaced apart vertical standards 26, 27 and 28 support upper longitudinal angle bars 29 and 30 in elevated position. Both of the angle bars 29 and 30 have secured thereto spaced apart brackets for carrying rollers in horizontal and inclined position to support the conveyer belt 31 to form a trough to carry the coal 32 as illustrated in Fig. 3. As shown in Figs. 1 and 2 the spaced apart brackets 33 carry the horizontal rollers 34 under the belt 31 while the brackets 35 at both sides of the conveyer carry the individual short inclined rollers 36 to deflect the side portions of the belt as shown in Figs. 1 and 2.

Between the lower longitudinal angle bar 24 and the upper longitudinal angle bar 30 is secured an electric motor 37 as shown in Fig. 2. This motor is connected by the gearing 38 in the gear casing 39 to the drive shaft 40 which extends from end to end of the conveyer unit as shown in Figs. 1 and 2. At the end portions of the drive shaft 40 and intermediate the ends thereof the shaft 40 has secured thereto the worms 41, 42 and 43 which mesh respectively with the worm wheels 44, 45 and 46.

As shown in Fig. 3 the worm wheel 44 is keyed to a transverse shaft 221 mounted in suitable bearings on the framework of the machine. This transverse shaft has mounted thereon and secured thereto a drum or pulley 46 for receiving the belt 31 to drive the latter. If all the driving power were applied to one such drum or pulley the latter would have to be of sufficient diameter to secure the necessary friction to operate the load. I prefer, however, to reduce the diameters of the driving drums or pulleys so that the conveyer units may be located and operated in low roof mines. The worm wheel 46 is therefore connected to drive the drum or pulley 47 at the other end of the machine and the worm wheel 45 is connected to drive the pulley 48 intermediate the ends of the machine. The belt 31 is therefore in driving connection with both of the end drums 216 and 47 as well as the intermediate drum 48. The power applied to the belt is therefore so distributed that the end pulleys may be reduced in diameter without injuring the belt and the pulley 48 may direct the belt 31 along the upwardly inclined paths as shown in Fig. 2 to secure additional friction as the drums or pulleys 216 and 47 are at the same time securing driving connection at the pulley 48.

When the motor 37 operates and the shaft 40 is driven the drums 216, 47 and 48 are simultaneously operated but the ratio of the gearing for each drum may be so proportioned as to secure the same driving speed for each pulley where it contacts with the belt 31, thus equalizing the driving power while being distributed at the various driving drums or pulleys.

Each conveyer unit may be provided with a pair of roof jacks 49 and 50 pivoted respectively at 51 and 52 to the framework of the machine as shown in Fig. 3.

Rigidly connected to the rear end of the framework of the machine are rearwardly extending connecting bars 53 and 54, rigidly connected respectively to the rear ends of the angle bars 24 and 23. These connecting bars are provided with eyes 55 and 56 so that the conveyer unit may be hinged or pivoted on a horizontal axis to a corresponding pair of bars which are respectively connected to the forward ends of the angle bars 23 and 24 at the forward end of the machine, as shown at 57 and 58 in Fig. 1. These bars 57 and 58 are offset as shown, so that the straight bars 53 and 54 of the next adjacent unit will be in proper position to have its eyes 55 and 56 register respectively with the eyes 59 and 60 of the bars 57 and 58, to receive the pivot pins to flexibly connect the unit, as illustrated in Fig. 5.

In Fig. 14 I have shown a modification of the flexible connections between the ends of the conveyer units in that the forward ends of the floor angle irons 24 are each provided with upwardly curved brackets 57' having a longitudinal opening at its upper end through which projects a screw-threaded rod 217 provided with an eye 59' at its forward end. By means of the nuts 219 and 220 the degree to which the eye 59' projects beyond the bracket 57' may be adjusted. In this manner connections may be more readily made between the units and when two or more units are connected in series, as shown in Fig. 5, the tension of the belt conveyer may be adjusted by extending or retracting the connections at 59'. It can readily be seen by referring to Fig. 7 that by means of the construction shown in Fig. 14 the angle bars 24 and 24' may be spread apart or brought closer together, thereby regulating the tension or slack in the conveyer belt comprising connections 31 and 31' which are secured together at 70.

The forward end of the driving shaft 40 of each conveyer unit is squared at 61 to fit into a corresponding socket 62, at the rear end of the next adjacent unit. Also at the end portions of the drive-shaft 40 are flexible couplings 63 and 64, each comprising a flexible element 65 connected between the shaft 40 and the socket 62, as shown in Fig. 6. It will thus be seen that when the units are flexibly connected together mechanically, the drive-shafts 40 are also flexibly connected together so that the power from the motor 37 on one unit may be transmitted along all of the shafts coupled end to end to effect distribution of the power to the conveyer belt on each unit. When the conveyer belts are connected in the manner hereinafter described to form one continuous belt extending along a plurality of conveyer units, the power from the motor on one unit will be distributed to three pulleys on each unit, and therefore the power transmitted to the belt will be distributed over a wide area along the entire sectional conveyer.

In Fig. 7, I have illustrated the manner of connecting one unit with the next adjacent unit. When the coupling bars 57 and 53', mounted respectively on the frames 24 and 24' are brought together, so that the pivot pin 66 may be inserted, the belts 31 and 31' of adjacent units may be disconnected at 67 and 68, and the ends swung upwardly and downwardly in the direction of the arrows, so that the ends of the belts can be secured together at 69 and 70 to form one continuous belt for the two adjacent sections.

In Figs. 15, 16 and 17 I have shown a construction which is particularly adapted to drawing the ends of the belt together so that the flexible pin shown in Fig. 10 may be inserted in position to connect the loops or hinges of the belt ends. The frame 71 shown in Fig. 16 is provided with an arm 72 which is pivoted at 73 to one branch of the frame 71. A bolt 74 is pivoted at 75 to one end of the frame 71. The screw-threaded portion of the bolt 74 extends through an opening in the outer end of the pivoted arm 72 and is adapted to receive a wing nut 76 for clamping the belt 31 securely to the frame 71.

In a similar manner the frame 77 may be provided with a pivoted arm 78 hinged at 79 and operated by the wing nut 80 to clamp the frame 77 to the belt 31'.

It should also be observed that the frame 71 is provided with rearward extensions 81 and 82 to extend over the top of the frame 77 and also remain rigidly connected to the frame 71. The arm 72 is also provided with a pair of rearwardly extending guide arms 83 and 84 to extend under the pivoted arm 78 as shown in Fig. 17.

Extending laterally from the frame 71 are the pins 85 and 86 in position to receive the hooks 87 and 88 respectively. On the frame 71 are the bearing standards 89 and 90 for supporting the rock-shaft 91 to which is connected the operating lever 92. At the other end of the rock-shaft 91 is a lever arm 93 pivoted at its lower end to the hook arm 88. Both the hook arms 87 and 88 are in parallel relation and pivoted respectively to the arms 92 and 93 at equal distances from the rock-shaft 91. The lever arm 92 is free to be moved forward so that the hooks 87 and 88 will reach over the pins 85 and 86 and engage the latter and then when the lever 92 is retracted the belts 31 and 31' may be drawn together so that their hinge loops 94 and 95 may be brought into registry as shown in Fig. 17 whereupon the flexible hinge pin 96 may be inserted to pivotally connect the ends of the belt.

As shown in Fig. 10 the flexible hinge pin for the belt ends comprises a metal coil or spring 97 mounted between the caps 98 and 99 with a rod 100 connecting them. This rod is preferably composed of spring metal or of such material that when made of comparatively small diameter it will bend in conformance with the bending of the conveyer belt as shown in Fig. 3 whenever the conveyer belt hinge moves along the angular deflecting rollers 36. The flexible pin is inserted into the hinge loops 94 and 95 from the left, as viewed in Fig. 10, the cross pin 101 being relied upon to limit the position of the pin in said loops. After the pin has been inserted into the loops as shown in Fig. 10, the locking pin 102 is inserted and bent as shown to hold the flexible pin in proper relation to the hinge loops at the ends of the belts while the latter is traveling over a plurality of conveyer units as a single belt made longer by connecting the belts together to act as a single belt.

In Fig. 4 I have shown a diagrammatic arrangement of circuits and connections which are particularly adapted for controlling the operation of the motor 37 which is mounted on one of the conveyer units. Extending from end to end of each conveyer unit is a pair of connecters 103 and 104, as shown in Fig. 11, these being mounted respectively in insulation 105 and 106 mounted in casings 107 and 108, secured to the framework of the machine.

Inasmuch as it may be desirable to transmit power from a motor on one conveyer unit to belt-driving mechanism on one or more additional conveyer units, and to control the motor from any conveyer unit, I prefer to locate a switch on each conveyer unit. For instance, on the motor unit the connectors or bus bars 103 and 104 are connected to motor controlling apparatus and a switch 109. Bus wires 110, 111 are provided on the next adjacent conveyer unit and electrically coupled at 112 to the bus bars 103, 104. In similar manner, the bus bars 113, 114 are electrically coupled at 115 to the bus bars 103 and 104. This coupling may be effected by the mechanism shown in Fig. 12, comprising a plug 116 and a socket 117, each provided with insulating material and operable in an obvious manner to connect the bus-bars 110 and 111 to the bus bars 103, 104. The metal pins 118 and 119 are adapted to fit into the metal sockets 120 and 121, to make the electrical connections, as shown in Fig. 12.

Referring again to Fig. 4, it will be seen that the switches 109, 122 and 123 are connected respectively with the upper bus bars 103, 110 and 113, which are indicated as being connected with the positive or plus main of the source of supply. In addition to the bus bars, there is also a wire or conductor extending from one end of the conveyer unit to the other, so that it may be coupled by means of an electric plug and socket switch similar to that shown in Fig. 12, but having a single pin and socket instead of a pair. Such wires or conductors are shown in Fig. 4 at 124, 125 and 126, coupled together as indicated diagrammatically at 127 and 128.

The solenoid 129 of the motor starter is connected by the wire 130 to the conductor 125 and by the wire 131 to the bus-bar 104 on the conveyer unit having the motor 37. When one of the switches 109, 122 or 123 is closed, the solenoid 129 will be connected between the positive and negative mains, whereupon the plunger 132 will be pulled upwardly to lift the lever 133 to which it is pivotally connected at 134, the lever 133 being also pivoted at 135 to the board 136 on which the motor starter is mounted.

The plunger 132 makes a liquid-tight fit in the bore of the brass solenoid spool, so that liquid 137 may be placed in the chamber above the plunger 132 to operate the valve 138 when the plunger 132 is moved. When the plunger 132 is moved upwardly, the liquid 137 will immediately close the valve 138 so that the liquid 137 must pass through the restricted opening 139 in the center of the valve 138. It will thus be seen that the liquid 137 passes into the chamber 140 through the restricted opening 139 and thereby retards the upward movement of the motor starter lever arm 133. When this arm engages the contact 141, the starting resistance 142 will be thrown into circuit with the motor armature 37'. This circuit may be traced from the positive bus bar 103 through the conductor 143 to the lever arm 133 and thence through the starting resistance 142, through the conductor 144, armature 37' and conductor 145, to the negative bus bar 104. As the starting resistance 142 is gradually cut out, the motor accelerates in speed to secure the proper operation of the endless belt conveyer. The motor may be shunt wound and the motor starter so arranged that when the arm 33 is moved upwardly from its lowermost position, it will engage the segmental contact 146 to connect the shunt field winding 147 across the constant potential mains.

When it is desired to stop the motor, the circuit may be cut off quickly because when the switch 109 is open and the other two switches 122, 123 are also open, the solenoid 129 will be deenergized and since the valve 138 is free to open downwardly, the liquid 137 will be free to move downwardly without being restricted. The arm 133 will therefore be restored to initial position quickly to effect the opening of the motor circuits. It should be understood that the switches 122, 109 and 123 are located on different conveyer units, so that when any one of these switches is operated, control of the motor starter may be effected to start or stop the motor which is mounted on only one of the conveyer units.

In Fig. 11 I have shown a trolley connector 148 comprising spaced-apart metal contactors 149 and 150 mounted on insulating material 151 in position to make electrical connection with the bus bars 103, 104 and thus receive current for the motor of a mine locomotive. For instance, with the bus-bars of the extended conveyer coupled together as illustrated in Fig. 4, a mine locomotive, by means of the trolley 148 of Fig. 11, may take current from the constant potential mains and travel along the conveyers on a track as illustrated at 152 in Fig. 18. It should also be understood that a locomotive may travel along the ground of a mine chamber while gathering current for its operation from the bus bars of a series of conveyer units connected together end to end with the bus bars electrically coupled.

In Fig. 18, I have illustrated a system of mining in which conveyers may be extended or shortened by the addition or detachment of conveyer units. As the central main entry is driven outwardly from the vertical shaft of the mine, additional conveyer units may be connected up from time to time as required and in each instance the belts connected so that they form one continuous conveyer driven by a single motor with the power to the conveyer belts distributed along the various units so that they may occupy relatively low positions in the mine chamber. The lateral or butt entries 153 and 154, may also be provided with a series of conveyer units connected end to end to form a single flexible extended conveyer for receiving dislodged material from the mining and loading machines illustrated at 155 and 156 in Fig. 18. It can readily be seen that as these mining machines continue to lengthen the butt entries, the conveyers 157 and 158 may continuously be lengthened in accordance with the mining operation. When the conveyers 157, 158 are operated, they deliver material from the mining and loading machines to the central conveyer 159 which, in turn, delivers the material to the mine cars for movement up the vertical shaft 160.

In a similar manner the conveyers 161 and 162 in the entries 163 and 164 deliver material to the conveyer 159, and in the entries 165 and 166, the conveyers 167 and 168 deliver material to the conveyer 159. After the main entries and the butt entries have been driven to the desired extent the retreating system of mining is carried out by removing the coal from the pillars by means of the mining and loading machines 169 and 170 which deliver the material to the extensible conveyers 171 and 172 which in turn deliver the material to the conveyers 167 and 168, respectively. The manner in which the material is received by an extensible conveyer from a mining and loading machine is illustrated at 173 in Fig. 5. In the same view at 174 is illustrated the manner in which material is delivered from one extensible conveyer to another.

In Fig. 18 I have shown by the dotted rectangles 173, the location of the various pillars which had been removed, while the irregular contours 174 represent the subsided roof. In order to properly support the roof adjacent the places where the mining operations are being carried on, the roof-supporting mechanism shown in Figs. 20, 21 and 22 are located back of the pillars which are being mined, the locations of these roof-supporting devices being indicated by the small squares 175 in Fig. 18. These roof-supporting devices may be in staggered relation, particularly after the roof has subsided. Before subsidence, however, it may be preferred to place them in closer relation as shown at 176 and 177 to secure the breaking of the roof along definite lines. For instance, in Fig. 18, it is desired that the next subsidence of the roof shall be as indicated at 178 and 179.

The roof supporting device which is particularly adapted for use in the system illustrated in Fig. 18, is shown in Figs. 20, 21 and 22. An elongated base support 180, U-shaped in cross-section, as shown in Fig. 21, is adapted to rest on the floor of the mine chamber. Another U-shaped plate 181 may be provided to support the bearing 182 of the roof-jack mechanism. This bearing is adapted to receive the ball-shaped lower end 183 of the screw-threaded post or standard 184. The lower end of the standard 184 is provided with the transverse opening 185 to receive the bearing pin 186 which is mounted in the bearing block 182. Transverse abutment pins or bars 187 and 188 may be placed in any one of the various openings 189 and 190 between the vertical plates of the support 181 to limit the swinging movement of the roof-jack on the pivot pin 186.

Threaded on the standard 184 is a nut 191 which is provided with spaced-apart openings or recesses 192, to receive a turning tool for operating the roof jack. Mounted on top of the nut 191, by means of the ball bearings 193 is a cylindrical shell or casing 194 which encloses the upper screw-threaded portion 195 of the standard 184. At the top of the shell or casing is a cap 196 screw-threaded into the upper end of the casing 195 and having a pivotal connection at 197 to a shoe 198, which is adapted to engage the roof of the mine chamber. The pivots 197 and 186 may be in various angular relations according to the slope of the floor and roof respectively, because the casing 194 may be readily turned on the ball-bearings 193 relatively to the standard 184. The ball-bearings 193 also facilitate turning of the nut 191 after the floor piece 180 and the roof shoe 198 are anchored in position against the floor and roof respectively.

In order to maintain the casing 194 in proper relation to the nut 191 and prevent the casing 194 from removal from the screw-threaded standard 184, the ring collar retainer 199 is secured at 200 to the nut 191 and provided with an inwardly extending ring 201 fitting over the ring 202 which is secured to the shell 194. It will thus be seen that the shell or casing 194 will be held in predetermined relation to the nut 191 while the ball bearings 193 permit the free rotation of the nut 191 to give the shell or casing 194 the rectilinear movement up or down. It should also be noted that the retainer 199 also protects the lower bearing from the accumulation of dust in the mine.

As shown in Fig. 20, eyes 203 and 204 may be secured to the ends of the base plate 180 so that the entire roof jack may be hauled from place to place in the mine so as to adjust its location as illustrated in Fig. 18.

After the main entries and the butt entries have been driven as illustrated in Fig. 18, partitions may be placed as illustrated at 205 so as to permit the two main side entries 206 and 207 to be used for directing the ventilation, as indicated by the arrows 208. As illustrated, the ventilation may be directed toward the places where mining operations are proceeding, the return being along the central main entry and thence up the vertical shaft 160 to the outer atmosphere.

Such ventilating system may be carried out in connection with the extensible conveyers by providing tubes or ducts 209 and 210 at the sides of the framework of the conveyer units, as shown in Fig. 3. Here the tube 209 is shown inflated, whereas the tube 210 is shown collapsed or deflated. In Fig. 13, I have shown how the ventilating tube 209 of one conveyer unit may be connected to the tube 209' of the next adjacent conveyer unit. The tube 209 is provided with a cylindrical metal extension 211 which is adapted to fit into the tube 209' so that the tubes may be buckled together, as shown at 212 and 213.

In addition to the tubes 209 and 210, additional tubes 214 and 215 may be provided at the lower sides of the framework as shown in Fig. 3, and such tubes may also be connected to corresponding tubes of adjacent conveyer units. These tubes 214 and 215 may be used for transporting water and compressed air, respectively. The couplings between the tubes of one conveyer unit and the tubes of the next adjacent conveyer unit may be the well known pipe couplings.

From the foregoing it will be seen that the conveyer units not only permit the conveyer to be extended, but also the ventilating duct, the electrical bus-bars or trolley supply connectors, the compressed air pipe and the water pipe. In addition to furnishing electric power to mine locomotives, the extension of the electrical bus-bars, in accordance with the extension of the conveyers provides the mining and loading machines with immediately available sources of electrical power for their operation, when desired. The compressed air would also be immediately at hand for operation of the mining and loading machines when the latter are provided with mechanism operated by compressed air. The water pipes are particularly adapted for connection with the pump for removing accumulations of water in the mine, particularly where the mining operations are proceeding and along the entries where the extensible conveyers are operating.

It should be particularly noted as an important feature of my invention that the extensible conveyer mechanism always provides the mining and loading machines which are now coming into practical use, with means for removing the coal as fast as it is dislodged so that such mining and loading machines can be operated continuously or without interruption on account of lack of mine cars for removing the coal. In other words, the extensible conveyer mechanism provides a constantly operated means of removing the coal as fast as it is dislodged by the mining and loading machines, and the latter may therefore be kept continuously in operation, thus greatly increasing their efficiency. It should also be understood that the use of the system of extensible conveyers will minimize the laying of mine tracks and the operation of mine cars with the usual dangers incident thereto. Furthermore, on account of the continuous operation of the conveyers, gradually taking the coal from the mining and loading machines and continually transferring such coal toward the mine shaft, the coal is maintained in larger lumps which reduces the amount of slack and permits the coal to be transported greater distances; also the reduction of slack reduces the amount of dust in the mine and increases the efficiency of the ventilation. The reduction of slack in the coal and the reduction of dust in the mine is due to the fact that the heights through which the coal must fall are greatly decreased by the use of the extensible conveyers operating at relatively low levels, as illustrated in Fig. 5.

Obviously those skilled in the art may make various changes in details and arrangement of parts without departing from the spirit and scope of the invention as defined by the claims hereto appended, and I wish therefore not to be restricted to the precise construction herein disclosed.

Having thus fully described and illustrated an embodiment of my invention, what I claim and desire to secure by Letters Patent of the United States is:

1. In conveyer apparatus, the combination with a plurality of individual units each adapted to operate as a complete conveyer and each adapted to rest on and slide over a mine floor, of means for flexibly connecting one unit to the next adjacent unit to extend the conveyer in length while accommodating itself to irregularities of such floor, driving connections for each unit, and flexible coupling mechanism between the driving connections of one unit and those of the next adjacent unit.

2. In conveyer apparatus, the combination with an elongated supporting frame adapted to rest on and slide over a mine floor, of an endless belt conveyer mounted on said frame, means at one end of said frame adapted to flexibly connect said frame to a similar adjacent frame having thereon another endless belt conveyer, power-transmission mechanism for operating said belt conveyer by distributing the application of power thereto, and a flexible coupling for connecting said power transmission mechanism to similar power transmission mechanism on said adjacent frame.

3. In conveyer apparatus, the combination with an elongated supporting frame having parallel skids adapting the frame to rest on and slide over a mine floor, of an endless belt conveyer adapted to have its ends disconnected and connected to the ends of another belt conveyer on another frame to form an extended endless belt conveyer, and means on said first-named frame adapted to flexibly connect the latter to such other frame when said extended endless belt conveyer is formed.

4. In conveyer mechanism, the combination with an elongated frame, of an endless belt conveyer, spaced apart drums at the ends of said conveyer mounted to rotate on parallel spaced-apart axes with the peripheries of said drums adjacent to the bottom of said frame, an additional drum mounted on said frame to rotate on a horizontal transverse axis in parallelism with said first named axes and in position to engage the lower side of the conveyer and deflect the lower run upwardly from each of said end drums, a drive-shaft extending longitudinally of said frame, and power transmission gearing connected between said drive-shaft and said three drums to positively rotate the same with substantially the same peripheral speed and to thereby distribute the application of power to the endless belt over three different portions thereof.

5. In a system of mining, the combination with a plurality of conveyer units, of means for coupling said conveyer units to form an extended sectional conveyer to the place of mining operations, a ventilating duct extending longitudinally of each conveyer unit, and means for coupling the ventilating ducts to form a continuous extended ventilating duct to the place of mining operations.

6. In a system of mining, the combination with an extended sectional conveyer, of means for uncoupling the outer sections of said conveyer while retaining the remaining portion of the sectional conveyer in operation during the retreating mining operations, and means for operating said sectional conveyer irrespective of its length to remove the material as fast as dislodged by said mining operations.

7. In conveyor appartus, the combination with a conveyer unit comprising a frame and an endless conveyer belt thereon, of means at one end of said frame for connection to another conveyer unit, means for connecting the ends of said belt and for connecting such ends to the ends of the conveyer belt of such other unit, and mechanism for adjusting such connecting means to regulate the tautness of said belts when connected together in an extended endless conveyer.

8. A conveyer unit comprising an elongated supporting frame having parallel spaced-apart skids adapted to rest on and slide over a mine floor, an endless conveyer belt on said frame with its ends detachably connected together, a drive shaft extending longitudinally of said supporting frame, means at both ends of said drive shaft for coupling the same to similar drive shafts on other conveyer units, power-transmission mechanism between said first-named drive shaft and said conveyer, and means at both ends of said frame for pivotally connecting the latter to similar frames of other conveyer units with the spacing predetermined to permit the belts to be reconnected into one continuous belt for a plurality of units.

9. In conveyer mechanism, the combination with a plurality of conveyer units each having an endless conveyer belt and each having a conveyer frame, of means for flexibly connecting said conveyer units by flexibly connecting said frames with the spacing predetermined to permit the connection of said conveyer belts into one endless conveyer belt traveling along all of said frames, power-transmission mechanism on each conveyer unit, flexible coupling means between the power-transmission mechanism on one conveyer unit and the power-transmission mechanism on the next adjacent conveyer unit, and means on each unit conveyer belt for connecting said belts to form a single extended conveyer belt composed of sections formed by said units.

10. In conveyer apparatus, the combination with a plurality of conveyer units having an endless conveyer belt and a frame, of an adjustable connection between said frames to predetermine the spacing between said conveyer belts, and belt fasteners adapted to connect said belts in one continuous belt travelling along both frames.

11. In conveyer mechanism, the combination with a plurality of conveyer units, of means for coupling said conveyer units to form an extended conveyer composed of sections corresponding to said conveyer unit, ventilation ducts mounted on said conveyer units and extending longitudinally thereof, and means for coupling said ventilation ducts to extend the same in accordance with the extension of said conveyer.

EDMUND C. MORGAN.